UNITED STATES PATENT OFFICE.

HAROLD A. MORTON, OF PITTSBURGH, PENNSYLVANIA, ASSIGNOR TO UNION CARBIDE COMPANY, OF NEW YORK, N. Y., A CORPORATION OF VIRGINIA.

PROCESS OF MAKING ACETONE.

1,315,525.     Specification of Letters Patent.     Patented Sept. 9, 1919.

No Drawing.     Application filed June 12, 1918. Serial No. 239,644.

*To all whom it may concern:*

Be it known that I, HAROLD A. MORTON, a citizen of the United States, residing at Pittsburgh, in the county of Allegheny and State of Pennsylvania, have invented certain new and useful Improvements in Processes of Making Acetone, of which the following is a specification.

This invention relates to the preparation of acetone by the decomposition, at elevated temperatures, of the vapors of acetic acid. According to the invention the acetic acid vapors, alone or mixed with water vapor, are brought into contact at suitable temperatures with a catalytic material containing manganese.

Among the catalytic materials which have proven effective in this reaction are the salts or mixtures of salts or other compounds of manganese, metallic manganese and alloys thereof, and, preferably, ferro-manganese of high manganese-content. By the use of manganese-containing catalysts, it is possible to prepare acetone from acetic acid at a much greater rate, and with a higher yield, than by the use of known catalysts, such as the acetates of barium, calcium, magnesium, zinc and the like.

Many metallic salts are known to have a catalytic effect in the formation of acetone from acetic acid, but many of these salts have also the effect of decomposing the acetone when the temperature is raised to the point of rapid acetone-formation. It is my discovery that in the presence of manganese-containing catalysts the temperature conditions necessary for rapid acetone-formation may be reached and maintained without material loss by decomposition of the acetone produced.

In the practice of my invention I preferably use a metallic or alloy catalyst containing manganese, this presenting the advantages, among others, that no extraneous support, such as pumice or the like, is required in order to present a large surface of catalyst to the vapors; and the relatively high heat conductivity of such catalyst renders it possible to maintain the temperature conditions practically constant, as well as uniform throughout the reaction zone.

I prefer to employ practically pure acetic acid vapors, although vapor of acetic acid mixed with water vapor may be used. When acetic acid vapor is mixed with water vapor the velocity of the reaction is greatly diminished, the water acting therefore as a negative catalyzer. The yield of acetone, calculated from the acetic acid transformed, is, however, not appreciably affected.

The mechanism of the reaction when a metallic (including alloy) catalyst is employed is probably as follows: the acetic acid vapors attack the surface of the metal, forming a film of manganese acetate, which immediately breaks down into acetone and manganese carbonate; the latter, under the action of further quantities of the acid vapors, is again transformed into acetate, and so on in continuous cycle. The interior of the catalyst remains unaffected for long periods at least, so that the desired heat conductivity of the mass is maintained. It will be understood from the above that it is requisite only that the catalyst should present surfaces containing manganese; and obviously I may apply such surfaces to metallic or other suitable supports by electrolysis or in any desired way.

In operation, acetic acid vapor, either preheated or not and with or without water vapors, is introduced in continuous flow into a metallic or other tube containing the catalyst, the latter preferably maintained at a temperature between 450° and 550° C., although the invention is not restricted to these temperatures, inasmuch as the process is operative over a much wider temperature range. The tube may be heated in an electric or other type of furnace affording a suitable control; and the acetic acid may either be introduced as vapor, or vaporized within the tube. The acetone is continuously condensed in the usual manner. It is preferred so to regulate the in-put of acetic acid as to obtain acetone substantially free from unchanged acetic acid. The crude acetone may be purified by fractional distillation, preferably over a dehydrating agent such as calcium chlorid, whereby a substantially pure product boiling at 56°–57° C. is obtained.

The following are illustrative examples of the practice of the invention, although the invention is not restricted to the particular conditions set forth:

Example 1: A tube 2 feet long by ¾ inch in diameter was filled with a catalyst prepared by depositing manganese acetate on a pumice support, and heated to a temperature of 490°–500° C. The acetic acid vapor was introduced at the rate of about 150 grams per hour. The yield of redistilled acetone (boiling point 56°–57° C.) was 95% of the theoretical.

Example 2: A tube 2 feet long and ¾ inch in diameter was filled with ferro-manganese, (about 85% Mn.) broken to pea-size, and heated by an electric furnace to a temperature of 490°–500° C. Into one end of the tube glacial acetic acid was introduced at the rate about 150 grams per hour. The acid was immediately vaporized and transformed to acetone, which was condensed in a cooled coil and caught in a receiver. The crude acetone was fractionated to separate it from the water, and a yield of 98% of the theoretical was obtained.

I claim:

1. Process of preparing acetone from acetic acid, which consists in subjecting acetic acid vapors at an elevated temperature to the action of a catalyst containing manganese.

2. Process of preparing acetone from acetic acid, which consists in subjecting acetic acid vapors at an elevated temperature to the action of a metallic catalyst presenting surfaces containing manganese.

3. Process of preparing acetone from acetic acid, which consists in subjecting acetic acid vapors at an elevated temperature to the action of ferro-manganese of high manganese-content.

In testimony whereof I affix my signature.

HAROLD A. MORTON.